US006259487B1

(12) United States Patent
Bril

(10) Patent No.: US 6,259,487 B1
(45) Date of Patent: Jul. 10, 2001

(54) METHOD AND APPARATUS FOR ENABLING A USER TO ACCESS DATA NETWORK APPLICATIONS FROM A TELEVISION SYSTEM

(75) Inventor: Vlad Bril, Campbell, CA (US)

(73) Assignee: TeleCruz Technology, Inc., San Jose, CA (US)

( * ) Notice: Subject to any disclaimer, the term of this patent is extended or adjusted under 35 U.S.C. 154(b) by 0 days.

(21) Appl. No.: 09/505,243

(22) Filed: Feb. 16, 2000

Related U.S. Application Data

(63) Continuation of application No. 09/301,443, filed on Apr. 28, 1999, now Pat. No. 6,057,888, which is a continuation of application No. 08/867,203, filed on Jun. 2, 1997, now Pat. No. 5,946,051.

(51) Int. Cl.$^7$ ....................................................... H04N 5/445
(52) U.S. Cl. ........................... 348/553; 348/563; 348/564; 348/569; 725/25
(58) Field of Search ..................................... 348/553, 563, 348/564, 569, 601, 584, 585, 589, 600; 725/25; H04N 5/445

(56) References Cited

U.S. PATENT DOCUMENTS

| | | | |
|---|---|---|---|
| 4,768,083 | * | 8/1988 | Romesburg . |
| 5,327,156 | * | 7/1994 | Masukane et al. ................... 345/113 |
| 5,355,328 | * | 10/1994 | Arbeiter et al. ................... 364/724.1 |
| 5,510,843 | * | 4/1996 | Keene et al. ........................... 348/446 |
| 5,539,428 | * | 7/1996 | Bril et al. ............................. 345/143 |
| 5,608,864 | * | 3/1997 | Bindlish et al. ...................... 395/507 |
| 5,611,041 | * | 3/1997 | Bril et al. ............................. 395/507 |
| 5,675,390 | | 10/1997 | Schindler et al. ................... 348/552 |
| 5,742,298 | * | 4/1998 | Bril et al. ............................. 345/501 |
| 5,742,349 | * | 4/1998 | Choi et al. ........................... 348/443 |
| 5,781,241 | * | 7/1998 | Donovan ............................... 348/441 |

* cited by examiner

Primary Examiner—Sherrie Hsia
(74) Attorney, Agent, or Firm—Law Firm of Naren Thappeta

(57) ABSTRACT

A television system (TV) which enables a user to view display represented by a television signal as well as to access data network applications. The TV includes an on-screen-display (OSD) controller which stores the network application data and other display entities in a memory module as separate bit maps. A single image for display on a TV display screen is generated by overlaying all the display entities (including television signal, network application data, pointer, and low resolution data) according to a predetermined priority. Display entities (other than TV signal) are stored in separate portions of the memory module as independent surfaces to enable the displays of individual display entities to be generated and modified according to the individual display entity requirements.

13 Claims, 6 Drawing Sheets

METHOD AND APPARATUS FOR ENABLING A USER TO ACCESS DATA NETWORK APPLICATIONS FROM A TELEVISION SYSTEM

RELATED APPLICATIONS

The present application is a continuation application of co-pending application entitled, "A Method and Apparatus for Enabling a User to Access Data Network Applications from a Television System" having Ser. No.: 09/301,443 filed on Apr. 28, 1999, U.S. Pat. No. 6,057,888 which in turn is a continuation of U.S. Ser. No. 08/867,203, filed Jun. 2, 1997, U.S. Pat. No. 5,946,051 having the same title. Both are incorporated by reference into the present application.

BACKGROUND OF THE INVENTION

1. Field of the Invention

The present invention relates to television systems, and more specifically to a method and apparatus for enabling a user to access data network applications (e.g., internetwork browsing) from a television system.

2. Related Art

Since the 1940s, television systems have been increasingly embraced by many households, particularly in the industrial countries. Television systems have generally been used to view broadcasts made in distant parts of the world or to view a pre-recorded program from a video cassette player (VCP). A significant proportion of the households presently have at least one television set in their homes. Television displays are presently available or anticipated to be widely available in analog (e.g., NTSC analog signal displayed on a CRT based display screen) as well as digital technologies (e.g., HDTV).

In parallel, data network applications (hereafter "network applications") have experienced a phenomenal growth since the mid-1980s. Network applications such as web-browsing and electronic mail have had a fundamental impact on the manner in which information is exchanged and disseminated. These network applications have particularly been implemented for and used along with computer systems such as personal computer systems, work-stations, and the like.

At least in view of the considerable presence of the television systems in the households, it may be desirable to provide the capability to access the network applications on television systems. However, there may be several problems which need to be addressed to enable access of data network applications from television systems.

For example, the display of network applications needs to be coordinated with the display of the television signal. The user may need to be provided the ability to select one display or the other, or to specify that each display occupy a portion of the television screen. Therefore, a television system may need to provide a user the ability to select one of television signal or the network application, and accordingly display the selection in a pre-specified portion.

In addition, the system may need to be designed to appropriately process the different forms/formats in which the signals of the network applications and television signal are received. For example, a television signal may be received in interlaced format (e.g., composite television signal in NTSC format) and the network application data may be received in a non-interlaced format. Further, the provision of network application access may need to be cost-effective for wider market acceptance.

Thus, what is needed is a method and apparatus which addresses such problems and provides a user the ability to access network applications from a television system in a cost-effective manner.

SUMMARY OF THE INVENTION

The present invention is directed to a method and apparatus for enabling a user to access data network applications from a television system. An on-screen display (OSD) controller is provided, which stores network application data and other display entities (such as text and pointer information) in a memory module. These other display entities may be provided for providing additional features or for enhancing the ease of use of the television system. For example, a pointer is provided to facilitate user interface operations and text may be used to display status messages (e.g., MUTE, VIDEO). OSD controller stores all the display entities in the memory module, typically as a bit map.

The display entities are stored in separate portions of the memory module. Such a storage enables the individual display entities to be modified (or defined) independently. As a result, the display of each display entity can be modified without necessarily impacting or being impacted by display of other display entities. For example, to achieve a scroll operation of the network application data, only the bit map of the network application data in the memory module needs to be updated. The display entitles are then overlayed prior to display in accordance with the present invention.

OSD controller overlays all the display entities stored in the memory module according to a predetermined priority. In one embodiment, pointer display entity is provided the highest priority, followed by text, network application data, and television signal in that order.

To overlay the different display entities, the present invention uses a transparency color. If a pixel data element of a display entity is set to the transparency color value, it indicates that the display entity need not be displayed in the pixel position (on television display screen) represented by the pixel data element. Accordingly, the corresponding pixel data element in the display entity with the next lower priority is considered for display on that pixel position. If all the display entities stored in the memory module have a value equal to transparency color for a given pixel position, the television signal (having the lowest priority) is displayed in the given position on the display screen. Thus, television signal display is considered to have the lowest priority.

In one embodiment, overlaying is performed on a pixel by pixel basis. Specifically, one of the corresponding pixel data elements (i.e., which are correlated to the same pixel position on display screen) of the display entities stored in memory module is selected according to the prioritization scheme described above. If all of these pixel data elements have a value equal to the transparency color, the television signal is displayed in the corresponding pixel position on the television display screen.

According to another aspect of the present invention, OSD controller generates one or more half-tone signals which cause the television signal display at a corresponding pixel position to be altered (e.g., displayed typically darker than that indicated by the television signal for that pixel position). To achieve such an alteration, OSD controller sets corresponding pixel data elements in the memory module to the half-tone values. The specific pixel data elements can be in any of the display entities stored in the memory module.

When a given pixel data element has a value equal to a half tone color value and corresponding pixel data elements of display entities of higher priority are found to be equal to the transparency color value, a half tone signal correlated with the given pixel data element is asserted. The assertion causes the television signal display at the same position as that of the given pixel to be altered (displayed darker).

Thus, the present invention enables a user to access data network applications from a television system. This is accomplished by storing network application data in a memory module along with other display entities.

Also, the present invention allows individual display entities (other than television signal) to be modified independently by storing each of such display entities in a separate portion of the memory module.

In addition, the present invention allows different display entities to be displayed on the same television display screen by overlaying the display entities. Also, these display entities are overlayed using a priority scheme.

Further, the present invention overlays the display entitis by using a programmable transparency color.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE DRAWINGS

The present invention will be described with reference to the accompanying drawings, wherein.

DETAILED DESCRIPTION OF THE PREFERRED EMBODIMENTS

Figure 1:
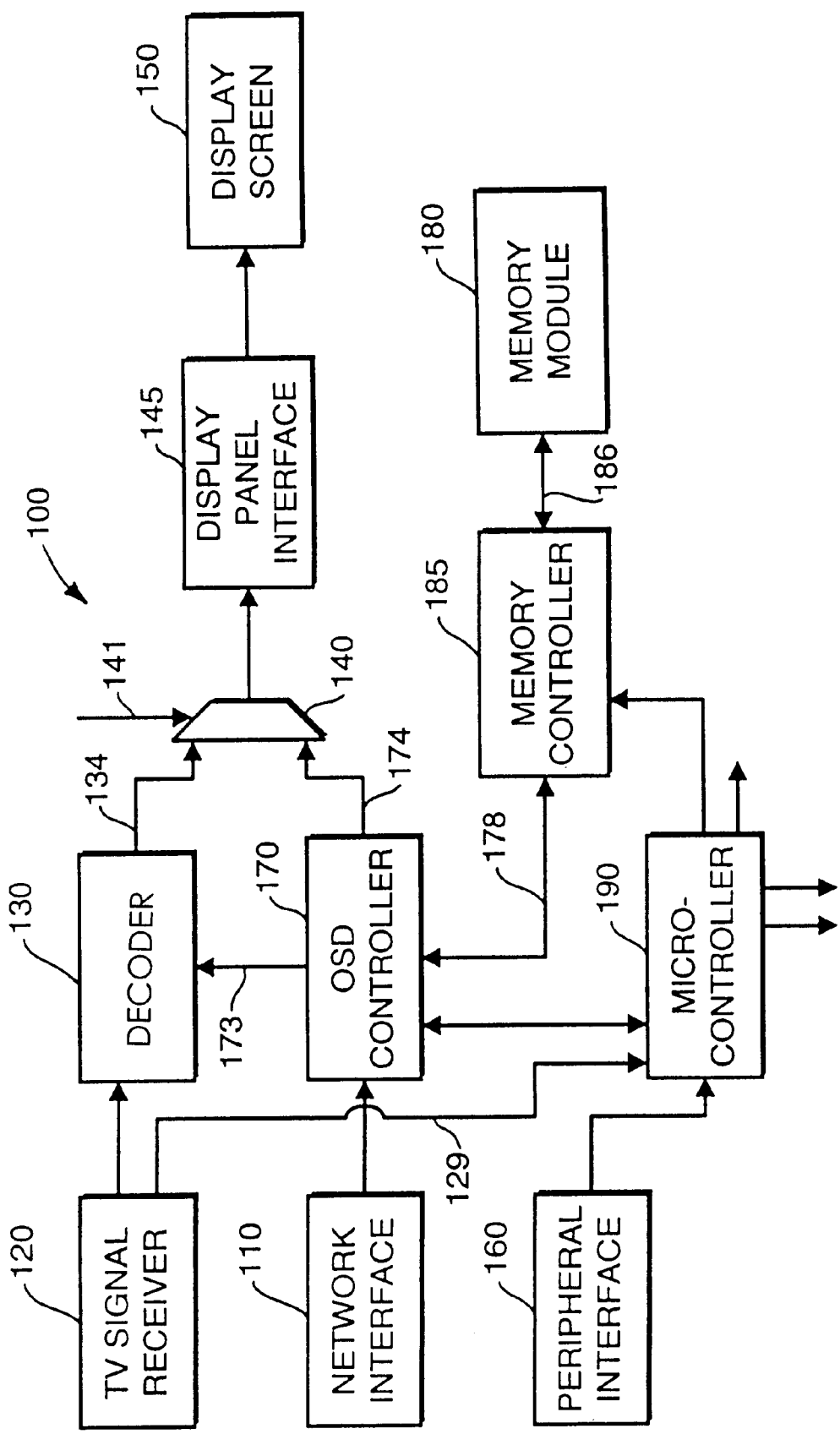
FIG. 1 is a block diagram of an example embodiment of a television system implemented in accordance with the present invention.

1. Overview and Discussion of the Invention

The present invention is described in the context of a circuit implemented in a television system. The circuit receives data corresponding to a network application on a network interface. The circuit further receives a television signal on a television interface. The circuit stores the received network application data in a memory, preferably in the form of a bit map. The circuit then accesses the network application data from the memory and determines whether to display the network application data or the television signal. The determination can be on a pixel-by-pixel basis.

In addition, the circuit models different display entities as different surfaces (described below). Display entities include, but not limited to, television signal, network application data, pointer and low resolution data. Low resolution data typically corresponds to text such as general status messages (e.g., MUTE, VIDEO) on the television display. However, other information can as well be displayed using low resolution. For example, icons representing various services, and data corresponding to TV guide can be displayed using low resolution. The text data can be received during vertical blanking interval of a television signal or as teletext.

Pointer provides a user the ability to select/actuate various displayed portions. All of these display entities are overlayed in accordance with the present invention to provide a unified display on a display screen of a television system.

Further, each of the display entities is modeled as a surface mapped independently to a single X, Y coordinate system. As will be clearer from the description below, such a mapping enables the present invention to modify each display entity according to the specific requirements of the corresponding display entity. For example, while displaying a television signal in one portion of a television display screen according to a continuously received television signal, network application data can be scrolled independently based on user-provided input. Thus, modeling each display entity as a surface provides the present invention the ability to modify the display of individual display entities independent of each other. The modified display entities are overlayed in accordance with the present invention to provide a unified single display on the television display.

The utility of the present invention can be appreciated with references to other systems which attempt to provide similar functions as the present invention, but do not employ one or more features of the present invention. Accordingly, examples of such other systems are explained first. The present invention is explained then in detail below.

2. Example Systems Which Do Not Use One or More Features of the Present Invention One example of a system which does not use one or more features of the present invention are what are commonly known as 'set-top' boxes in the industry. A set-top box is typically provided as a unit separate from a television system. The set-top box generates a composite video signal (e.g., in NTSC or PAL formats) representative of network application data. This composite video signal is usually displayed on the entire television screen similar to a signal received from a video camera recorder/player (VCR/VCP).

The set-top box based scheme of displaying network application data on television systems has several disadvantages. For example, a user may wish to view network application data on only a part of the television display screen while viewing television programs received in parallel. Such a function is not commonly provided as integral to the set-top box functionality. In addition, a set-top based service can be expensive as the set-top box is packaged as a separate unit.

Television systems with in-built display controllers for displaying text are also available in the industry. However, the text display is limited usually to display of status messages such as MUTE, VIDEO. In these systems, text display is achieved by using a small memory and a read-only memory (ROM). Specifically, ASCII-Attribute pairs which need to be displayed are pre-stored in the memory. For each ASCII-Attribute pair, a bit map is stored in the ROM. Scan line pixel data (for display on television screen) is generated by accessing a bit map corresponding to each ASCII-attribute pair stored in the memory.

In such a system, any data to be displayed may need to be represented as a font. In general, these systems are not adapted to or designed for providing access to network applications.

As will be clear from the description below, the present invention provides a flexible mechanism by which a user can view network application data and television signal display in parallel. This flexibility is achieved by overlaying different display entities according to a priority. In addition, the present invention can be implemented as an integrated circuit which is incorporated into the television system itself. As the cost for such integration is typically low, the overall cost of providing network application access from a television system may also be correspondingly decreased.

Before describing the invention in great detail, it is useful to describe an example television system environment in which the invention can be implemented. The details of implementation and operation of the present invention are then explained in detail.

3. Example Environment

In a broad sense, the present invention can be implemented in any television system. For purposes of illustration, the invention will be explained in the context of a television system implemented using analog (e.g., using CRTs) technology. However, it will be apparent to one skilled in the art how to implement the present invention with digital technologies (e.g., HDTV) without departing from the scope and spirit of the present invention.

FIG. 1 is a block diagram of a television system (TV) 100 comprising network interface 110, TV signal receiver 120, TV signal decoder 130, multiplexor 140, display panel interface 145, display screen 150, peripheral interface 160, on-screen-display (OSD) controller 170, memory controller 185, memory module 180, and micro-controller 190. TV signal receiver 120 is coupled to decoder 130, which in turn is coupled to multiplexor 140. Network interface 110 is coupled to OSD Controller 170, which in turn is also coupled to multiplexor 140 and memory controller 185. Multiplexor 140 is coupled to display panel interface 145. Display panel interface 145 is coupled to display screen 150.

Peripheral interface 160 is coupled to micro-controller 190. Micro-controller 190 generates control and clocking signals to coordinate and control the operation of the remaining components of television system 100. For purpose of clarity, only some of the connections from micro-controller 190 are shown in FIG. 1. Each of the components of TV 100 are explained in further detail below.

Network interface 110 receives network application data from an external source. Network interface 110 can be a telephone modem, cable modem or any other interface which is designed to operate with the external source. The external source can be, for example, a dial-up connection (point-to-point) or a network connection implemented using a communication protocol. Even though network interface 110 is shown as a single block, it should be understood that it may contain more than one unit depending on the specific requirements of the individual television system.

Network interface 110 receives data corresponding to a network application such as web-browsing, electronic mail in a known way. The data may be received in one of known formats such as ASCII, HTML, VRML etc. which are encoded as electrical signals. Network interface 110 sends signals representative of the network application data to OSD Controller 170.

OSD Controller 170 (an embodiment of which will be described in detail in subsequent sections) receives network application data from network interface 110, and stores the received data in memory module 180 by interfacing with memory controller 185. Bus 178 may be used for the interface between OSD Controller 170 and memory controller 185. Bus 186 may provide the electrical interface between memory controller 185 and memory module 180. OSD Controller 170 transforms the network application data as is suitable for storage and retrieval from memory module 180. In one embodiment, OSD Controller 180 stores the network application data as a bit map encoded in RGB format in memory module 180. In addition, OSD controller 170 may be designed to store other display entities as well. These display entities may provide additional capabilities or enhance the ease of use of television system 100.

OSD controller 170 generates a unified display of the display entities stored in memory module 180 and the external received television signal by overlaying all the display entities according to a priority scheme. To overlay the display entities stored in memory module 180, OSD controller 170 can have internal logic to select among the display entities. OSD Controller 170 sends on line 174 data representing the overlay of display entities stored in memory module 180. OSD controller 170 may perform such selection on a pixel-by-pixel basis. Memory module 180 may include one or more physical memory units as suitable for the specific requirements for which TV 100 is designed for.

TV signal receiver 120 receives a television signal from sources such as cable service providers, television (relay) stations, digital video disk players etc. The TV signal is generally received in a known format, for example, in NTSC composite video format. TV signal receiver 120 sends the received signal to decoder 130, which encodes the color component of the TV signal into digital format.

In one embodiment, decoder 130 encodes TV signal in RGB format in a known way. In addition, decoder 130 receives one or more half-tone signals on line 173 from OSD controller 170. In response to receiving the half-tone signals, decoder 130 alters (e.g., increases/decreases color intensity) of the TV signal display at corresponding display pixels. The data resulting from encoding are termed as television signal pixel data elements. A single television signal pixel element data is generally altered in response to a half-tone signal. The manner in which half-tone signals are generated and used will be described in further detail below. Decoder 130 forwards the television signal pixel data elements to multiplexor 140 on line 134.

The TV signal received by TV signal receiver may further include synchronization signals such as HSYNC and VSYNC well known in the art. Micro-controller 190 receives these signals on line 129 and generates clock and control signals to the remaining components based on the synchronization signals. The signals are designed to coordinate and control the operation of various components. In particular, the signals can operate to ensure that the pixel data elements received on lines 134 (for television signal) and 174 (the overlayed image of display entities stored in memory module 180) correspond to the same point/pixel on display screen 150.

Multiplexor 140 receives the encoded television signal data and pixel data representing the overlay of surfaces stored in memory module 180 as inputs on lines 134 and 174 respectively, and selectively forwards one of the two inputs to display panel interface 145 under the control of select line 141. As the pixel data elements received on the respective lines 134 and 174 correspond to the same point on display screen, the selection is performed on a pixel-by-pixel basis. The selection results in another overlay. Thus, all the display entities are overlayed before a unified display is provided on display screen 150. From the description herein, it will be apparent that multiplexor 140 along with OSD controller 170 form a selection circuit to overlay the display entities displayed by television 100. In one embodiment, select line 141 is controlled by OSD Controller 170 and each multiplexor input corresponds to a single pixel on display screen 150.

Multiplexor 140 along with select line 141 operates to select between the television signal and the pixel data received on line 14. Even though the processing of television signal and network application data is explained with reference to RGB data, it should be understood that the present invention can be implemented using other data formats also without departing from the scope and spirit of the present invention.

Display interface 145 receives data from multiplexor 140, and converts the received data in a form suitable for display on display screen 150. If display screen 150 is implemented as a CRT screen, display interface 145 generates electrical signals to control the scan circuitry usually associated with CRT screens. The design and implementation of display interface 145 depends on the specific technology chosen for display screen 150. The implementation of display interface 145 will be apparent to one skilled in the art based on the description provided herein. It is contemplated that the present invention can be implemented with technologies such as digital television systems (e.g., HDTV) and flat-panel based TVs, projection TVs based on DMD (digital mirror display) etc.

Thus, in one embodiment, OSD controller 170 of the present invention stores the network application data in memory module 180 and causes the multiplexor 140 to select the appropriate input. Display signals are generated based on the data outputted from multiplexor 140. OSD controller 170 can use different implementation schemes in selecting the network application data or the TV signal as will be apparent to one skilled in the art by reading the description provided herein.

Peripheral interface 160 can include an interface for one or more peripherals. In one embodiment, interfaces are provided for push-buttons and infra-red remote. Push-buttons can be found on conventional television sets, and are generally used for functions such turning the television set ON/OFF, volume control etc. Infra-red remote interface operates in conjunction with remote control devices, which may be used for several functions such as television control (tuning, voice control, remote control etc.), enabling network applications etc. Devices such as key-boards which facilitate easy entry of ASCII data can be interfaced using infra-red interfaces. The implementation of these interfaces will be apparent to one skilled in the relevant arts based on the disclosure provided herein.

Memory controller 185 interfaces with OSD controller 170, and enables OSD controller 170 to store and retrieve data from memory module 180. The implementation of memory controller 185 depends on the specific technology chosen for memory module 180, and can be provided integral to a memory storage unit. The manner in which data is organized in memory module 180 and the manner in which data is retrieved will be clearer from the description below.

An implementation of OSD controller 170 will be explained in further detail below. However, it is helpful to understand the different display entities and the manner in which they are stored in the memory module 180. Accordingly, the display entities are explained below first, followed by a description of example embodiments of memory module 180 and OSD controller 170 in that order.

4. Display Entities

As briefly noted above, different display entities are overlayed to provide one unified display on display screen 150. In one embodiment, the display entities include network application data (representative of external data applications a user may wish to use), television signal, pointer, and low resolution data (e.g., to display status messages on TV 100). Web browsing application is an example of a network application. However, the word network application as used here can include other applications accessed by point-to-point communication path also.

Each of the display entities is modeled as a surface that is mapped to a single coordinate system. Such a single coordinate system enables the present invention to correlate each point on the surfaces of display entities to a point/pixel on display screen 150. As a result, OSD controller 170 can determine which display entity to display on display screen 150 on a point by point basis.

In the description here, each surface and the overall final display will be explained as having the same dimension as display screen 150. However, it should be understood that the surfaces may have larger dimensions, and only portions of such larger dimensions may be mapped to display screen 150. The portions displayed on display screen may be controlled by graphics interfaces such as scroll-bars. Such extensions will be apparent to one skilled in the relevant arts based on the description provided herein.

The surfaces are overlayed in accordance with an aspect of the present invention. The image resulting from the overlay is displayed on display screen 150. The manner in which the surfaces (or display entities) are overlayed and displayed in one embodiment will be clearer from the description below.

5. Method of Overlaying and Displaying the Display Entities

Figure 2:
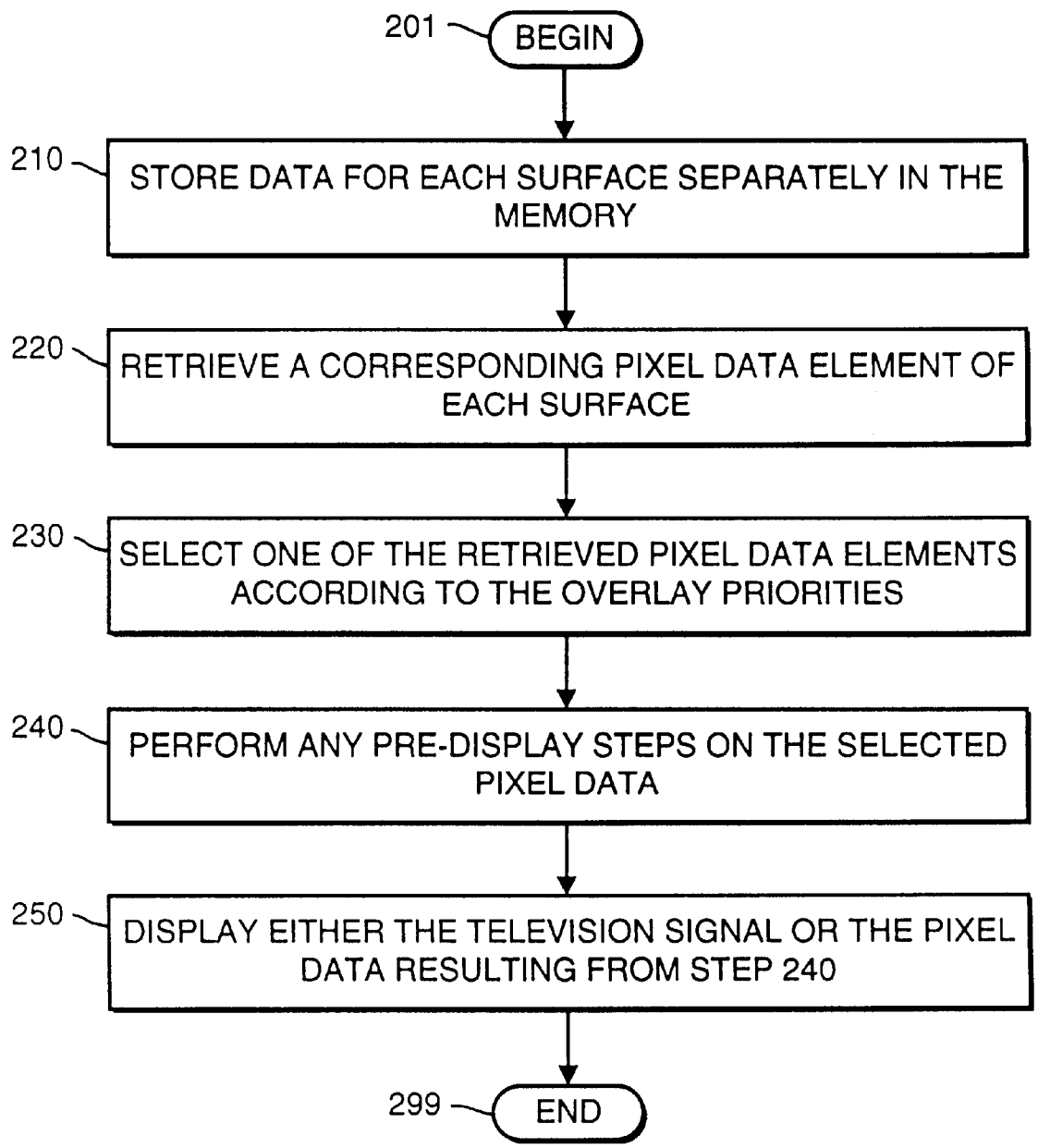
FIG. 2 is a flowchart illustrating a method of overlaying and displaying different display entities in accordance with an aspect of the present invention.

FIG. 2 is a flowchart illustrating the manner in which the display entities are overlayed and displayed. The method starts in step 201 and control passes to step 210. In step 210, the data for each surface is stored separately in memory module 180. In one embodiment, the data for each surface is stored in different portions of the memory. The data may be stored to optimize access speeds or other variables of interest. As the data for each surface is stored separately, each display entity can be modified independent of others. Accordingly, when a display entity is displayed based on the modified surface data, the final display will correspond to such modification if the display entity is selected for display in the steps below.

Steps 220, 230, 240, and 250 are performed for each point on the display entity surfaces in one embodiment of the present invention. Either the television signal or the pixel data element resulting from these steps is displayed on the corresponding pixel of display screen 150. Each of the steps is explained in further detail below.

In step 220, a corresponding pixel data element of each surface is retrieved. That is, all the pixel data elements retrieved correspond to a particular pixel (hereafter "present screen pixel") on display screen. In step 230, one of the retrieved pixel data elements is selected according to the overlay priorities as explained below.

In one embodiment, the pointer is given the highest priority. That is, if the pointer is present (or placed by the user) on the present screen pixel, the pixel data corresponding to the pointer is selected for display. A user may be given the option to disable the pointer, in which case the pointer surface data is not considered for display. After the pointer, the text data and network application data are given higher priority in that order. One way of implementing such priorities will be apparent from the description with respect to the memory module and OSD controller provided below.

After a pixel data element is selected, pre-display steps may optionally be performed on the selected pixel data in step 240. For example, the pixel data may be filtered to reduce flicker which may otherwise result due to sharp transitions in display. Such sharp transitions are typically present in data applications. As another example, the pixel data element may be adapted for display on the specific type of display screen 150.

In step 250, either the pixel data element resulting from step 240 or television signal corresponding to the same present screen pixel is displayed. The selection scheme in step 250 also defines a priority scheme. In one embodiment, the television signal is given lower priority than the display entities stored in memory module 180. From step 250, control passes to step 299, where the method depicted by FIG. 2 ends. The manner in which different priorities can be implemented will be clear from the description below.

6. Example Implementation of Memory Module

Figure 5:
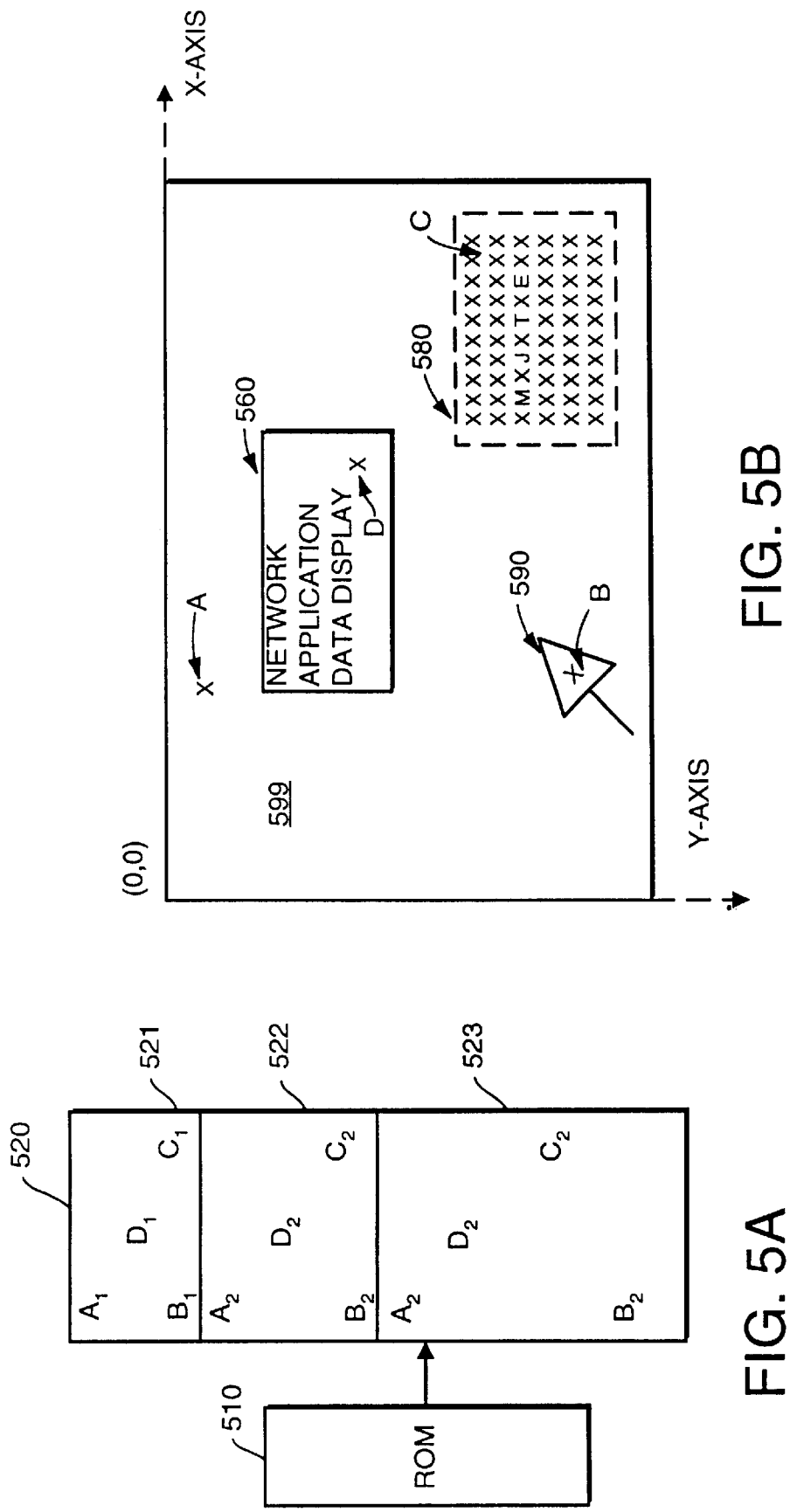
FIG. 5A is a block diagram of an example implementation of a memory module illustrating the manner in which different display entities are stored in different portions of a RAM in one embodiment of the present invention.
FIG. 5B is a block diagram representing a display on a television display screen illustrating the manner in which different display entities are displayed on different portions of the display screen.

An example implementation of memory module 180 and the data storage convention is explained with reference to FIGS. 5A and 5B. FIG. 5A is a block diagram illustrating memory module 180 in one embodiment. FIG. 5B depicts the display on a television display screen 150 when data in RAM 520 is processed according to an embodiment of the present invention. As will be clear from the description below, FIG. 5A in conjunction with FIG. 5B illustrate a convention according to which priorities can be implemented.

With reference to FIG. 5A, memory module 180 can include ROM 510 and RAM 520. Each of ROM 510 and RAM 520 can include several modules as may be required for storage requirements in a particular environment. ROM 510 can store bit maps for various text elements, including font and pointer, and program instructions for microcontroller 190. In one embodiment, RAM 520 is implemented using a static RAM for faster access. In addition, RAM 520 having multiple ports for reading/writing can be chosen for enhanced performance. However, other types of memory can be used as RAM 520 as will be apparent to one skilled in the art by reading the description provided herein.

As already noted, OSD controller 170 stores each display entity as a different surface, with each surface being stored separately. Thus, pointer, low resolution data, and network application data are represented as being stored in portions 521, 522 and 523, respectively. A final display is generated by overlaying these surfaces on television signal display as will be explained below. To facilitate the overlay operation, each of these surfaces can be defined with reference to a common X, Y coordinate system. For example, the left top corner of the television signal may be viewed as a point with coordinates (0, 0) as shown in FIG. 5B.

Each of the surfaces can be stored using different number of bits per pixel (bpp) depending on the display color resolution sought for that display entity. For example, pointer may be stored using 2 bpp, using 4 bpp, and network application data using 8 bpp. By using lesser number of bits for display entities not requiring a high degree of color resolution, the storage space in RAM 520 may be optimally utilized, without the need for buffering on any one surface.

In one embodiment, each portion 521, 522, 523 of RAM 520 include sufficient storage to store each display entity as a bit map. That is, each portion includes sufficient memory storage to store a number of pixel data elements equal to the number of pixels on display screen 150. However, a different scheme for representing the display elements (or bit maps) can be used without departing from the scope and spirit of the present invention. For example, in an alternative embodiment, pointers may be maintained to define location and dimensions of one or more display entities, and pixel data for only the valid pixel data elements can be stored. Irrespective of the scheme for storing the display entities, each of these portions is updated to correspond to the corresponding display entity.

Different portions are updated from different sources. The bit maps representing pointer and low resolution data elements (preferably in different fonts) can be stored in ROM 510 and transferred to specific portions of RAM portions 521 and 522 as determined by where the pointer and low resolution data are respectively to be displayed on display screen 150. The specific position of pointer may be determined by user input. Network application data is received on network interface 110 as explained above. The display entities (including the television signal) are overlayed to generate the final display on display screen 150 as will be explained in further detail with reference to FIG. 5B.

With reference to FIG. 5B, there are illustrated examples of television signal display 599, text (low resolution) display 580, pointer display 590, and network application display 560 on television display screen 150. Area 560 corresponds to the area surrounded by the solid line defining the area 560. Area 599 corresponds to the area outside of box 560. Points A, B, C, and D are shown as points on television signal display 599, pointer display 590, low resolution display 580, and network application display 560 respectively.

As noted earlier, television signal display is given the lowest priority. Accordingly, the other displays are overlayed 'on top of' television signal display 599. The priorities are implemented by using a 'transparency color'. Also, the pixel displays represented by 'x' within area 580 represent half-tone displays, also explained below.

With reference to FIGS. 5A and 5B, there are illustrated one way of representing bit maps for each display entity. That is, each portion 521, 522, and 523 stores data values for each pixel on display screen 150. A1, A2, and A3 represent pixel element data values corresponding to point A of the display of FIG. 5B. Similarly, B1–B3, C1–C3, and D1–D3 represent data values corresponding to points B, C, and D respectively. The values of all the pixel data values are chosen so as to enable OSD controller 170 to implement priorities and half-tone signals.

In relation to transparency color, the transparency color is used to implement priorities among all the display entities. The transparency color can be programmable. A pixel data element of a portion is set to the transparency color if the corresponding portion is not displayed in the corresponding display screen pixel position. For example, at position A, none of the three display entities stored in RAM 520 are displayed. Accordingly, A1, A2 and A3 are each set equal to the transparency color.

Thus, if a pixel data element has a value equal to the transparency color, another pixel data element in a lower priority display entity is considered for display. If all the pixel data elements for a display pixel position have a value equal to the transparency color, the television signal is displayed at that display pixel position. Also, if a higher priority display entity has a pixel element value which is not equal to the transparency color, the lower priority display entities can also have pixel data values which have values not equal to transparency color value. In this case, the values in the lower priority display entities can be ignored. The transparency color bit-map is typically created by operating system driver working in conjunction with OSD controller. Operating system and its drivers can be stored and provided from ROM.

As regards to half-tone color feature, it provides a convenient mechanism by which the television signal display can be altered in specific pixel positions. For example, the television signal display can be darkened in the pixel corresponding to another entity display so as to provide for better visibility of the another entity as can be understood with the pixels in the low resolution area 580 as explained below.

Low resolution display area 580 includes display of text 'MUTE'. If this text were to be displayed without altering the television signal in pixel position represented by 'x' there, the text 'MUTE' may not be visible clearly. Instead, the present invention enables the television signal to be altered (specifically darkened) in the pixel positions corresponding to 'x'. Due to such alteration, the pixel positions corresponding to text 'MUTE' would be more clearly visible to the user. The manner in which the alteration can be achieved using half-tone color and signals is explained below with reference to pixel position shown as 'C' in area 580.

As already noted, C1, C2, and C3 represent the pixel data values for the pixel position C for the pointer, low resolution and network application data displays respectively. As the display of the area 580 is controlled by low resolution display, C1 may be set equal to the transparency color value. To alter the television signal display for pixel position C, C2 may be set equal to a half-tone color value. When OSD controller 170 receives the half-tone color value, it sends a half-tone signal on bus 173 (of FIG. 1) to cause decoder 130 to alter the television signal display at the corresponding pixel.

Thus, by a proper choice of half-tone color values of pixel positions 'x', micro-controller 190 can cause the background display to be altered or darkened. Even though half-tone color display is explained with reference to text display, it should be understood that the half-tone colors can be used with other display entities stored in memory as well. However, in one embodiment, half-tone colors are not provided with pointer pixel data.

Thus, RAM 520 (or memory module 180, in general) contains various data values which are used to achieve different visual effects. The manner in which an embodiment of OSD controller 170 achieves these affects (half-tone, overlays) will be clear from the description below.

7. Example Implementation of OSD Controller

Figure 3:
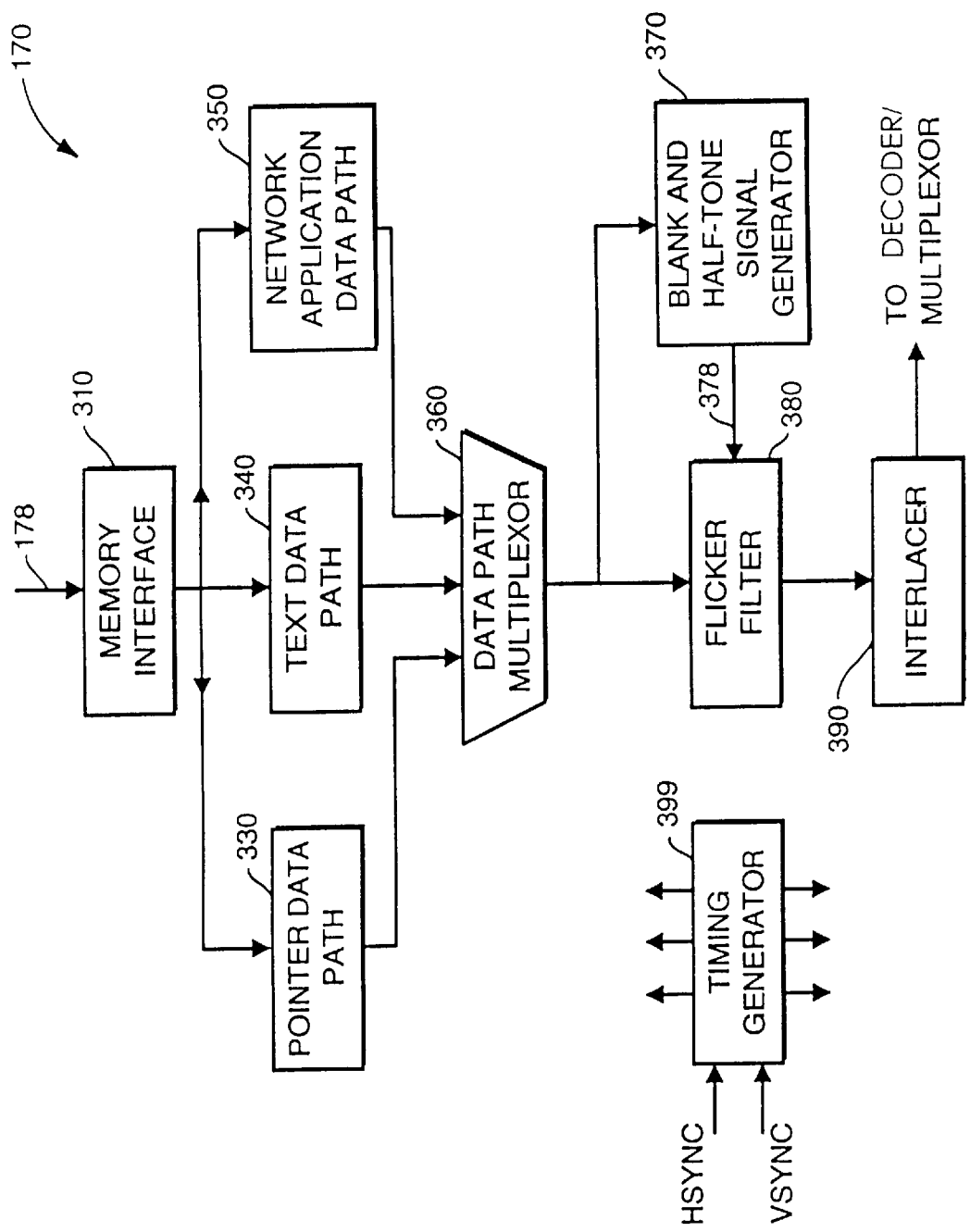
FIG. 3 is a block diagram of an example implementation of an on-screen display controller illustrating the components therein.

FIG. 3 is a block diagram illustrating an example implementation of OSD controller 170 comprising memory interface 310, pointer data path 330, low resolution (text) data path 340, network application data path 350, data path multiplexor 360, blank and half-tone signal generator 370, flicker filter 380, interlacer 390, and timing generator 399.

The three data paths 330 (pointer), 340 (low resolution data) and 350 (network application data) receive data from memory module 180 via memory interface 310. Memory interface 310 interface provides the electrical and other protocol functions to interact with memory controller 185 to provide the pixel data elements to the three data paths. Data path multiplexor 360 is coupled to the outputs of the three data paths 330, 340 and 350. Half-tone and blank generator 370 and flicker filter 380 are coupled to the output of data path multiplexor 360. Interlacer 390 is coupled to the output of flicker filter 380. Timing generator 399 is coupled to all the other components of OSD controller 170, but the connections are not shown for purpose of clarity.

Data is received by the three data paths 330, 340 and 350, typically in response to command from micro-controller 190 to memory controller 185. The commands include operations to store and retrieve data from memory module 180. Memory controller 190 can execute programs defined by data retrieved as a result of execution of the commands. Some of the retrieved commands cause data to be transferred to data paths 330, 340 and 350, and the transferred data may correspond to the pallette data stored in the respective data paths.

The store commands cause data to be stored in memory module 180 (specifically in RAM 520 of FIG. 5A). Such data is typically stored to modify (or define) a corresponding surface. For example, if television 100 receives additional network data from an external source, the received data may be stored in memory module 180. Similarly, if a user causes the pointer to be moved (for example, by movement of a joy stick/mouse), data is received to reflect the new position of the pointer. When the surface data with the changes is displayed, a correspondingly changed image is displayed.

Continuing with the description of memory controller 185 with reference to FIG. 3, memory controller 185 retrieves pixel data elements for each of the paths 330, 340, and 350. Each retrieved pixel data element corresponds to a specific pixel position on display screen 150. This specific pixel position in turn matches a position corresponding to the television signal received in parallel. Accordingly, a decision is made whether to display the television signal or the pixel data element selected from the paths 330, 340, and 350 on a pixel by pixel basis.

The data paths 330, 340, and 350 will be explained with reference to an example embodiment of network application data path 350. However, the description is applicable to other data paths as well. Network application data path 350 receives multiple pixel data elements in each word from memory controller 185. Network application data path 350 then performs steps such as serialization to extract each pixel data element from the received word. For example, if network application data is encoded in 8 bpp format and if each received word includes 16 bits of pixel data, network application data path 350 serializes the 16 bits into two pixel data elements.

Network application data path 350 may further include a palette table to convert the 8 bits of pixel data into color data with more number of bits in a known way. For example, each pixel data element may be mapped into 5:6:5 or 6:6:6 RGB data. The pallette table in turn may be loaded (from ROM 510) by appropriate data in response to commands from micro-controller 190 as already noted. From the above, it will be readily understood that each of the data paths 330, 340 and 350 generates as output a pixel data element in a pre-determined format.

Data path multiplexor 360 selects one of the three pixel data elements received from the data paths 330, 340 and 350 according to a predetermined priority and using the transparency color. An example method implemented by data path multiplexor 360 is explained below with reference to FIG. 4.

Blank and half-tone signal generator 370 generates a blank signal and half-tone signals. The blank signal is used to select the pixel data element selected by data path multiplexor 360 or the corresponding point of the television signal display. The blank signal is accordingly provided on line 141 of FIG. 1. Specifically, if the output of data path multiplexor equals the transparency color, the television signal is displayed. The manner in which blank signal is generated in one embodiment will be explained below with reference to FIG. 6.

In one embodiment, blank and half-tone generator 370 provides the blank and half-tone signals to flicker filter 380 on bus 378 to flicker-filter 380. In turn, flicker filter 380 stores and/or transfers data bits representative of these signals correlated with the pixel data selected from data path multiplexor 360. Such a correlation allows OSD controller 170 to appropriately process corresponding portion (point) of television signal received in another path. As noted above, half-tone signals cause television signal display to be altered and are provided on line 173 to decoder 130 of FIG. 1. One embodiment for generating the half-tone signals will be described with reference to FIG. 6.

Flicker filter 380 filters the received pixel data element in a known way. Filtering generally has the effect of smoothing the image eventually displayed. As a result of image smoothing, flicker may be reduced in the display on display screen 150. In one embodiment, flicker filter 380 includes a buffer to store two or more lines of data. However, a different number of lines can be stored and used during filtering as will be apparent to one skilled in the relevant arts by reading the description provided here. Filtering may be performed relative to both previous lines and subsequent lines. Also, filtering may be optionally disabled by bypassing flicker filter 380 and providing the selected pixel data element directly to interlacer 390.

Interlacer 390 receives pixel data elements representing a non-interlaced image and provides as output alternate lines representing an interlaced image. Odd lines and even lines are provided alternately. The conversion is performed as display screen 150 is designed to display an interlaced image. In one embodiment, interlacer 390 uses different clocks for receiving input and generating output lines, with the input clock having twice the frequency of the output clock.

It should be noted that a new pixel data value is typically generated by the operation of flicker filter 380. Accordingly, the blank and half-tone signals are generated before pixel data elements are processed by flicker filter 380. It should be further noted that interlacer 390 may be bypassed (or eliminated) if display screen 150 is implemented using non-interlaced technology.

Timing generator 399 generates the clocking and control signals for different components of OSD controller 170. Timing generator 399 receives as input the HSYNC and VSYNC signals from the television signal (connection not shown in FIG. 1) and generates signals to ensure that the overlayed image pixel data elements sent from interlacer 390 (and blank/half-tone signals) correspond to the individual points on the image of the television signal.

The output of interlacer 390 is provided as an input to multiplexor 140 on line 174. As will be apparent from the description above, the output of interlacer 390 represents the overlayed image of the display entities stored in RAM 520. In addition, the blank signal generated by data path multiplexor 360 is provided on signal line 141. One value of blank signal causes multiplexor 140 to select the television signal pixel data element received from decoder 130, and the other value of the blank signal line causes multiplexor 140 to select the pixel data element received from interlacer 390. Thus, the blank signal determines how the overlayed signal is prioritized in relation to the television signal for the pixel under consideration. The manner in which the blank signal and half-tone signals can be generated will be explained in further detail below with reference to FIGS. 5 and 6.

8. Generating blank/half-tone signals in one embodiment

The selection of one of the three pixel data elements and generating the blank signal is explained in further detail with reference to FIG.4, which is a flow-chart illustrating a method of prioritizing the display entities and of generating half-tone signals in one embodiment of the present invention. As already explained, transparency color value is stored in individual pixel positions in memory module 180 to achieve priortization. Also, half-tone color values are stored in individual pixel positions to generate half-tone signals, which cause television signal display to be altered at individual pixel positions. Prioritization and half-tone signal generation are explained in detail below.

Broadly, the method gives priority to pointer, low resolution data, and network application data displays in the decreasing order. That is, if the pointer area covers the present screen pixel position (i.e., the point on the display screen 150, on which the pixel data elements can potentially be displayed), the pixel data element received from pointer data path 350 is selected and displayed. Pixel data element corresponding to low resolution data is selected only if the pointer area does not cover the present screen pixel position. In such a situation, the pointer bit map for that pixel is set to transparency color. In one embodiment, half-tone colors are not used in conjunction with pointer data. As can be appreciated, micro-controller 190 selects an appropriate transparency color and ensures a consistent operation in all the components.

Figure 4:
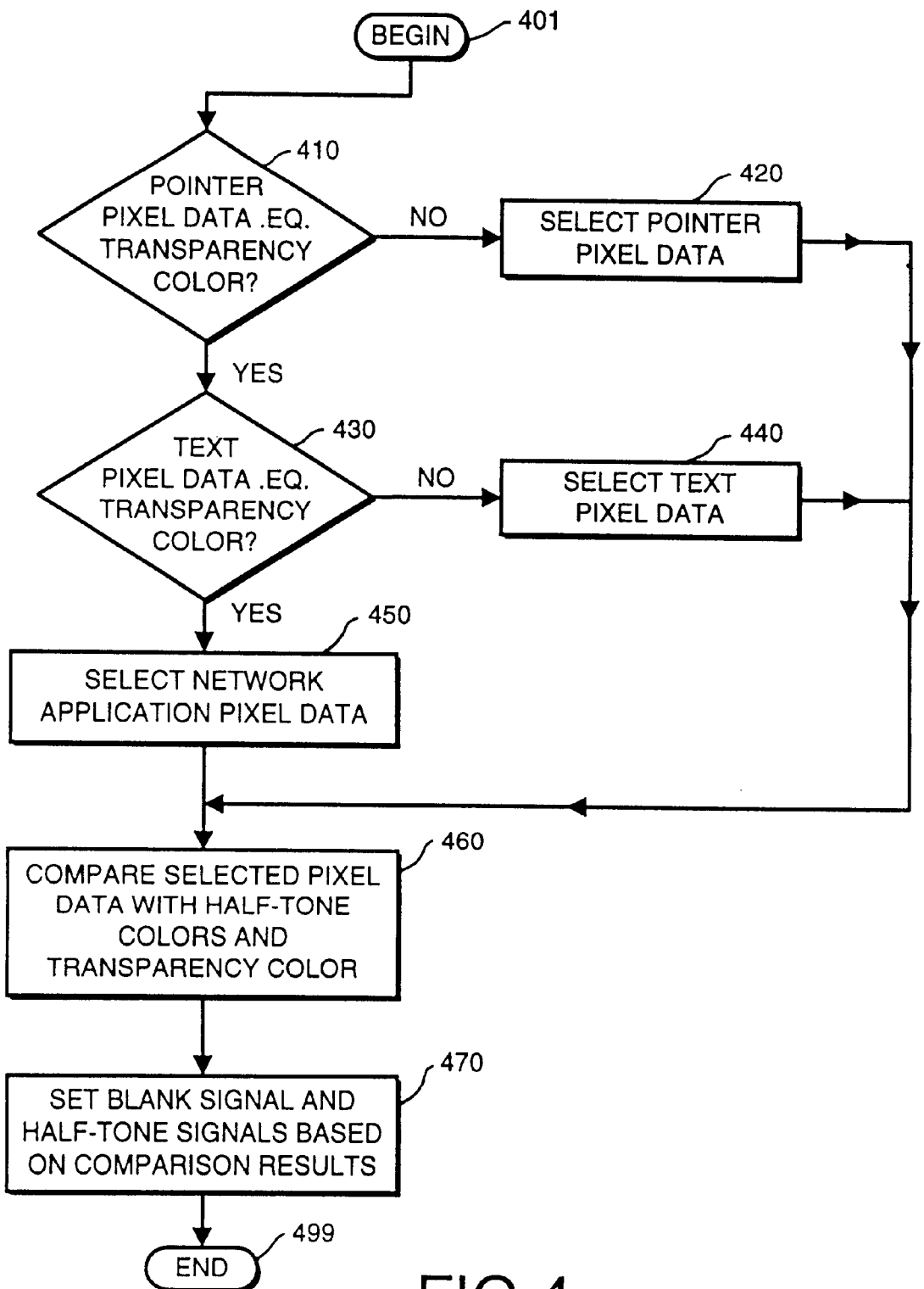
FIG. 4 is a flow chart illustrating an example method of implementing display priorities in one embodiment of the present invention.

The method of FIG. 4 operates taking into consideration the above described principles.The method starts in step 401 and control passes to step 410. Thus, in step 410 a determination is made whether the pixel data element received on pointer data path 350 equals the transparency color. If an equality if not detected, the pointer pixel data element is selected in step 420. That is, step 420 is performed if the pointer area covers the present screen pixel position or if the television signal needs to be altered at that pixel position display on television screen 150.

If equality is detected in step 410 (i.e., pointer pixel is set to transparency color), the low resolution data pixel data element is compared to the transparency color in step 430. If equality is not detected in step 430, the low resolution data pixel data element is selected in step 440. If equality is detected in step 430, the network element pixel data is selected in step 450. In other words, the network application pixel data element is selected if both pointer and text pixel data elements have a value equal to transparency color. From the above description it should be understood that pointer data is given the highest priority, followed by low resolution data and network application data in that order.

Steps 460 and 470 operate to generate the blank and half-tone signals. In step 460, the pixel data element selected according to steps 430, 440 and 450 is compared with half-tone colors and transparency color. In step 470, the blank signal and half-tone signals are set according to the comparison. From step 470, control passes to step 499, where the method depicted by FIG. 4 ends. An embodiment implementing the two steps will be described with reference to FIG. 6 below.

Figure 6:
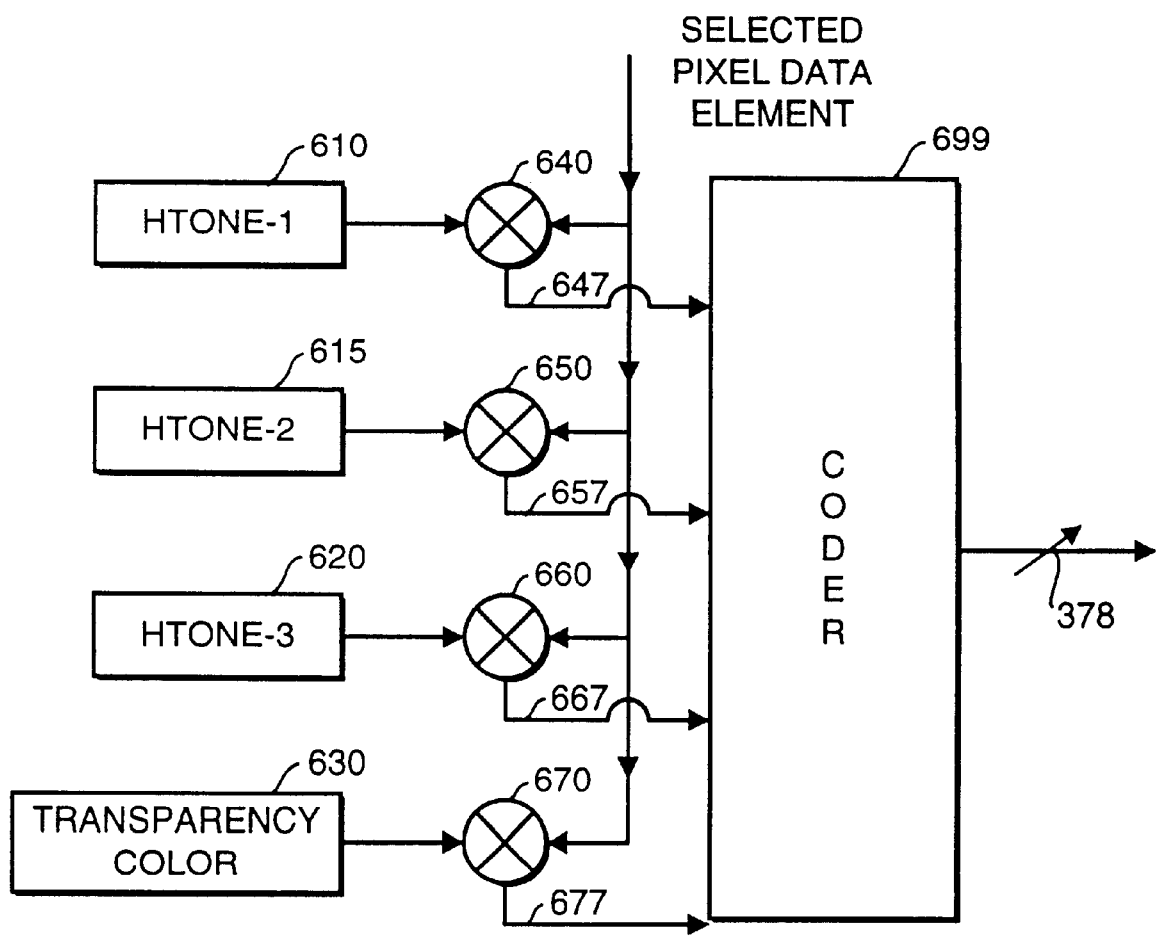
FIG. 6 is a block diagram illustrating an example circuit for generating a blank signal and the overlay signals.

FIG. 6 is a block diagram of a circuit which generates the blank signal and half-tone signals in one embodiment. The circuit includes four programmable registers 610, 615, 620, and 630, four comparators 640, 650, 660, and 670, and coder 699. Comparator 640 accepts as inputs the pixel data element selected in steps 410–450 and the content of programmable register 610, and generates a signal which is indicative of the result of the comparison on line 647. The four programmable registers 610, 615, 620, and 630 store half-tone 1, half-tone 2, half-tone 3, and transparency color value respectively. Comparators 640, 650, 660, and 670 compare the selected pixel value with the contents of programmable registers 610, 615, 620, and 630 respectively. The results of the comparison are available on lines 647, 657, 667, and 677 respectively.

Thus, lines 647, 657, and 667 respectively indicate whether the selected pixel data element has a value equal to half-tone 1, half-tone 2, and half-tone 3 colors respectively. As noted above, the corresponding half-tone signals generated cause TV signal decoder 130 to alter (e.g., make darker) display on the corresponding points of display screen 150. In addition, different half-tone signal can cause the pixel display to be altered to a different degree. For example, half-tone 1 may cause the television signal pixel display to be extremely dark while other half-tone signals can cause the display to be less darker (or brighter or set to a user-definable color).

Line 677 represents the blank signal. It should be noted that the comparison in comparator 670 returns an 'EQUAL' signal only if all the pixel data elements received on the three data paths 330, 340, and 350 have a-value equal to transparency color. In that case, the blank signal is said to be unasserted (or deasserted) and the television signal is caused to be displayed by the appropriate control of multiplexor 140. When the blank signal is asserted, the pixel data element provided by OSD controller 170 is displayed Thus, signal 677 is eventually sent to multiplexor 140 on line 141. It should further be noted that when the blank signal is unasserted, the values on the lines 647 and 657 may not be of any consequence.

As at most only one of the values on lines 647, 657, and 667 can have a value of 1 (i.e., match), coder 699 encodes the bits on these lines into two lines/pins (OVER-LAY 1 and OVER-LAY 2). As OSD controller 170 can be implemented as an integrated circuit packaged as a semiconductor chip, such encoding reduces the number of pins on the chip and the size of the storage for filter line buffers and/or interlacer storage. In addition, as he half-tone and blank signals are stored correlated with the pixel data element selected by data path multiplexor 360, the encoding avoids the need for excessive data storage.

Table 1 shown below summarizes the manner in which half-tone and blank signals affect the display on television screen, and the values output by coder 699. It may be noted that when a half-tone signal is generated, the blank signal is deasserted causing the television signal to be displayed, but the television signal display is altered according to the specific half-tone signal asserted as specified by the OVRLY1 and OVRLY2 signals. The OVRLY1 and OVRLY2 signals are provided to decoder 130 on bus 173. It should be understood that the number of half-tone signals explained here is merely representative and a different number of half-tone signals can be used without departing from the scope and spirit of the present invention.

TABLE 1

| Blank | Half-Tone | Comments | BLANK, OVRLY2, OVRLY1 Encoding |
|---|---|---|---|
| deasserted | deasserted | display normal TV image | 0, 0, 0 |
| deasserted | asserted | display altered (darker) TV image | 001, 010, 011 for three levels of half-tone (Note that blank is deasserted in these combinations) |

TABLE 1-continued

| Blank | Half-Tone | Comments | BLANK, OVRLY2, OVRLY1 Encoding |
|---|---|---|---|
| asserted | don't care | display pointer, low resolution or network application data | 1, x, x ('x' represents don't-care value) |

Thus, OSD controller 170 stores the network application data and other display entities in a memory module to provide network application access capability. Each of the display entities are stored in different portions of the memory module such that each can be independently modified. The modified display entities are overlayed on each other according to a priority scheme to generate a final display on a television display screen.

As the present invention allows the display of network application data along with television signal in a unified manner, a television system which allows a user to access network applications can be implemented. By providing the half-tone signals and the ability to use a pointer, the ease of use of such a television system may be enhanced. Half-tone signals provide for display which clearly delineates different display entities, while the pointer feature provides for graphical user interfaces. In addition, the text elements may be marked with a box, to make it more visible and meaningful.

It should be understood that it will be apparent to one skilled in the relevant arts to implement various modifications to the embodiments described above without departing from the scope and spirit of the present invention. For example, in one alternative embodiment, pixel data representative of television signal can also be stored in memory module 180, and the overlaying can be accomplished by using another data path in parallel to data paths 330, 340, and 350. In such an embodiment, the television signal display can be upscaled or downscaled using one of several schemes known in the art. The television signal can also be displayed as a window (similar to network application data) in this alternative embodiment.

In yet another alternative embodiment (described now with reference to FIG. 1), OSD controller 170 can store the display entities as a single surface in memory module 180. That is, instead of overlaying display entities after retrieving pixel data elements from memory module, OSD controller 170 first overlays the display entities and stores data representative of the overlayed image in memory module.

There may be several disadvantages with this alternative embodiment. For example, this alternative embodiment may consume more memory. Additional memory may be consumed as the display information for lower priority display entities may need to be preserved if/when display entities of higher priority are being displayed and as all display entities may need to be stored using the same color resolution. In addition, with this alternative embodiment, each time there is a change in one display entity, the single surface may need to be 'rendered.' Rendering generally refers to the process of generating the data corresponding to the single surface data, which is stored in the memory module 180. As such, this alternative embodiment may be less suited in some commercial applications.

9. Conclusion

While various embodiments of the present invention have been described above, it should be understood that they have been presented by way of example only, and not limitation. Thus, the breadth and scope of the present invention should not be limited by any of the above-described embodiments, but should be defined only in accordance with the following claims and their equivalents.

What is claimed is:

1. A television system which displays images encoded in a television signal and also enables a user to access a network application, said television system comprising:

a decoder receiving said television signal and extracting a display signal portion representing an image encoded in said television signal;

a network interface receiving data corresponding to said network application;

a memory module;

a memory controller storing a plurality of pixel data elements representing the images of the data corresponding to said network application;

a display screen; and a circuit receiving said plurality of pixel data elements and said display signal portion, said circuit generating an overlaid image of said image encoded in said television signal, said circuit causing said overlaid image to be displayed on said display screen, wherein the display of images representing data corresponding to said network application enables said user to access said network application.

2. The television system of claim 1, wherein said circuit comprises:

a multiplexor selecting either said image encoded in said television signal or one of said plurality of pixel data elements on a point by basis; and display interface receiving the output of said multiplexor and generating a display on said display screen based on the selection of said multiplexor.

3. The television system of claim 2, wherein said circuit further comprises an on screen display (OSD) controller circuit coupled to said memory controller, said OSD controller circuit storing said plurality of pixel data elements in said memory module by interfacing with said memory controller.

4. The television system of claim 3, further comprising a sync extractor receiving said television signal and extracting synchronization signals from said television signal, said sync extractor forwarding said synchronization signals to said OSD controller circuit which uses said synchronization signals to ensure that a pixel data element received by said multiplexor at each time point corresponds to a same point on said display screen as the point on said image encoded in said television signal.

5. The television system of claim 4, wherein said display screen supports scanning in an interlaced format and said image in said television signal is also encoded in interlaced format, and wherein said OSD controller circuit first filters said image representing data of said network application to generate a filtered image, said OSD controller circuit generating an interlaced image of said filtered image, and then generating said overlaid image based on said interlaced image of said filtered image and said image encoded in television signal.

6. A display circuit for use in a television system, said display circuit displaying images encoded in a television signal on a display screen contained in said television system, said display circuit also enabling a user to access a network application, said display circuit comprising:

a decoder receiving said television signal and extracting a display signal portion representing an image encoded in said television signal;

a network interface receiving data corresponding to said network application;

a memory module;

a memory controller storing a plurality of pixel data elements representing the images of the data corresponding to said network application; and a first circuit receiving said plurality of pixel data elements and said display signal portion, said first circuit generating an overlaid image of said image encoded in said television signal, said first circuit causing said overlaid image to be displayed on said display screen, wherein the display of images representing data corresponding to said network application enables said user to access said network application.

7. The display circuit of claim 6, wherein said first circuit comprises:

a multiplexor selecting either said image encoded in said television signal or one of said plurality of pixel data elements on a point by basis; and display interface receiving the output of said multiplexor and generating a display on said display screen based on the selection of said multiplexor.

8. The display circuit of claim 7, wherein said first circuit further comprises an on screen display (OSD) controller circuit coupled to said memory controller, said OSD controller circuit storing said plurality of pixel data elements in said memory module by interfacing with said memory controller.

9. The display circuit of claim 8, further comprising a sync extractor receiving said television signal and extracting synchronization signals from said television signal, said sync extractor forwarding said synchronization signals to said OSD controller circuit which uses said synchronization signals to ensure that a pixel data element received by said multiplexor at each time point corresponds to a same point on said display screen as the point on said image encoded in said television signal.

10. The display circuit of claim 9, wherein said display screen supports scanning in an interlaced format and said image in said television signal is also encoded in interlaced format, and wherein said OSD controller circuit first filters said image representing data of said network application to generate a filtered image, said OSD controller circuit generating an interlaced image of said filtered image, and then generating said overlaid image based on said interlaced image of said filtered image and said image encoded in television signal.

11. A display circuit used in a television system, said display circuit enabling the display of data corresponding to a network application accessible from said television system, said display circuit further enabling the display of a television image encoded in a television signal, said display circuit comprising:

a memory storing a plurality of display entities including data representing said network application and said television image, each of said display entities being stored as a plurality of pixel data elements;

a plurality of datapath circuits, each of said plurality of datapath circuits being designed to process said plurality of pixel data elements corresponding to one of said plurality of display entities, each datapath generating a pixel data element of a corresponding display entity, all the pixel data elements generated by said plurality of datapath circuits being related to the same point on a display screen contained in said television system;

a multiplexor circuit receiving said pixel data elements generated by said plurality of datapath circuits and selecting one of said received pixel data elements; and a display panel interface generating display on said display screen contained in said television system, said display being based on the pixel data element selected by said multiplexor circuit, whereby an overlaid image of said network application data and said television image can be generated on said display screen.

12. The display circuit of claim 11, wherein said plurality of display entities further contain a pointer and a text data.

13. The display circuit of claim 12, wherein said memory comprises a random access memory (RAM).

* * * * *